United States Patent
Roche

(10) Patent No.: US 10,427,447 B2
(45) Date of Patent: Oct. 1, 2019

(54) METHOD OF LAMINATING MULTI LAYER STRUCTURE TOGETHER IN A ROLL-TO-ROLL PROCESS TO MAKE A PRE-LAMINATION THAT MAY BE USED IN THE MAKING OF CREDIT AND GIFT CARDS AND MIRROR IMAGE VARIATIONS THEREOF

(71) Applicant: Griff and Associates, L.P., Fallsington, PA (US)

(72) Inventor: Timothy Roche, Bristol, PA (US)

(73) Assignee: Griff and Associates, L.P., Fallsington, PA (US)

(*) Notice: Subject to any disclaimer, the term of this patent is extended or adjusted under 35 U.S.C. 154(b) by 0 days.

(21) Appl. No.: 15/597,952

(22) Filed: May 17, 2017

(65) Prior Publication Data

US 2018/0043726 A1 Feb. 15, 2018

Related U.S. Application Data

(60) Provisional application No. 62/337,756, filed on May 17, 2016, provisional application No. 62/483,490, filed on Apr. 10, 2017.

(51) Int. Cl.
| | |
|---|---|
| *B42D 25/46* | (2014.01) |
| *B32B 27/00* | (2006.01) |
| *B32B 37/00* | (2006.01) |
| *B32B 37/14* | (2006.01) |
| *B42D 25/20* | (2014.01) |
| *B42D 25/328* | (2014.01) |
| *B42D 25/36* | (2014.01) |

(Continued)

(52) U.S. Cl.
CPC ............. *B42D 25/46* (2014.10); *B32B 27/00* (2013.01); *B32B 37/0015* (2013.01); *B32B 37/144* (2013.01); *B32B 38/06* (2013.01); *B32B 2425/00* (2013.01); *B42D 25/285* (2014.10); *B42D 25/328* (2014.10); *B42D 25/36* (2014.10); *B42D 25/48* (2014.10)

(58) Field of Classification Search
CPC .... B42D 25/285; B42D 25/328; B42D 25/36; B42D 25/455; B42D 25/46; B42D 25/48
See application file for complete search history.

(56) References Cited

U.S. PATENT DOCUMENTS

| | | | | |
|---|---|---|---|---|
| 4,133,926 A | * | 1/1979 | Vorrier .................... | B32B 27/08 428/200 |
| 4,343,851 A | * | 8/1982 | Sheptak .................. | B32B 27/08 428/212 |

(Continued)

*Primary Examiner* — David R Dunn
*Assistant Examiner* — Christopher E Veraa
(74) *Attorney, Agent, or Firm* — Sand, Sebolt & Wernow Co., LPA

(57) ABSTRACT

The invention provides a free flowing copolymer between disparate plastic layers to thermally balance between the two differently expanding/contracting materials. The "primer" layer or "thermal balance layer" fully encapsulates the PET layer and can absorb the difference between the internal PET layer with any layer bonded to the encapsulated PET without cracking, bending or pitting and can "reset" into position when the heating/cooling has ended to make planar plastic core sheets for products such as credit cards, gift cards and the like.

10 Claims, 4 Drawing Sheets

(51) Int. Cl.
 *B42D 25/48* (2014.01)
 *B32B 38/06* (2006.01)

(56) References Cited

U.S. PATENT DOCUMENTS

| | | | | |
|---|---|---|---|---|
| 4,519,155 | A * | 5/1985 | Gallagher | B42D 25/23 |
| | | | | 283/109 |
| 4,522,428 | A * | 6/1985 | Small | G06K 19/06196 |
| | | | | 235/449 |
| 5,145,548 | A * | 9/1992 | Yamamoto | B32B 37/1027 |
| | | | | 100/151 |
| 5,688,738 | A * | 11/1997 | Lu | B32B 27/30 |
| | | | | 503/227 |
| 6,581,839 | B1 * | 6/2003 | Lasch | G06K 7/0013 |
| | | | | 235/468 |
| 9,623,699 | B2 * | 4/2017 | Ritter | B42D 25/45 |
| 9,731,480 | B2 * | 8/2017 | Bhattacharya | B32B 27/08 |
| 2015/0041545 | A1 * | 2/2015 | Martinez Mondejar | |
| | | | | B32B 5/16 |
| | | | | 235/488 |
| 2015/0041546 | A1 * | 2/2015 | Herslow | G06K 19/02 |
| | | | | 235/492 |
| 2015/0266606 | A1 * | 9/2015 | Wiegers | B32B 27/08 |
| | | | | 156/230 |
| 2015/0290958 | A1 * | 10/2015 | Genet | B41M 5/0256 |
| | | | | 428/32.5 |
| 2017/0120663 | A1 * | 5/2017 | Philippe | B42D 25/455 |

\* cited by examiner

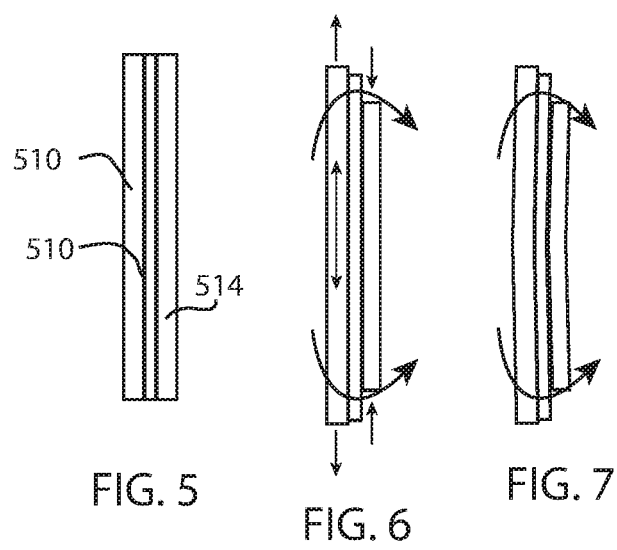

METHOD OF LAMINATING MULTI LAYER STRUCTURE TOGETHER IN A ROLL-TO-ROLL PROCESS TO MAKE A PRE-LAMINATION THAT MAY BE USED IN THE MAKING OF CREDIT AND GIFT CARDS AND MIRROR IMAGE VARIATIONS THEREOF

CROSS REFERENCE TO RELATED APPLICATIONS

This application claims the benefit of U.S. Provisional Application 62/337,756, filed May 17, 2016, entitled A METHOD OF LAMINATING FIVE LAYERS TOGETHER IN A ROLL-TO-ROLL PROCESS TO MAKE A PRE-LAMINATION THAT MAY BE USED IN THE MAKING OF CREDIT AND GIFT CARDS, which is incorporated herein by reference. This application also claims the benefit of U.S. Provisional Application 62/483,490, filed Apr. 10, 2017, entitled A METHOD OF LAMINATING FIVE LAYERS TOGETHER IN A ROLL-TO-ROLL PROCESS TO MAKE A PRE-LAMINATION THAT MAY BE USED IN THE MAKING OF CREDIT AND GIFT CARDS AND NON-SYMMETRICAL VARIATIONS THEREOF, which is also incorporated herein by reference.

BACKGROUND OF THE INVENTION

1. Field of the Invention

The present application relates to a method of making credit cards, gift cards and the like.

2. Description of the Prior Art

The current provision for creating the roll-to-roll lamination (PreLAM) consists of multiple layers designed for the manufacture of credit and gift cards among other types. The current market is being supplied by a PreLAM that limits the card manufacturer to use what is called a balanced (i.e., a front to back "Mirror Image") structure. This is the traditional method construction:

PVC ("polyvinyl chloride") front - clear
PVC core - printed front and back
PVC back sheet - clear Because there are currently multiple types of polymers used in order to incorporate holograms, silver mirror, among other special effects in the cards, the cards are built as shown below in a symmetrical design to prevent induction of manufacturing flaws:

Design A (Front of Card)

PVC - clear front cover
PET ("Polyethylene terephthalate") - decorative, metalized, hologram, etc.. over-printed front design
PVC - split core Design B (Back of Card)

PVC - split core
PET - clear over printed back design
PVC - clear bottom cover

The two symmetric pieces are then assembled together (i.e., A+B) to make the card.

Current Design

The current invention uses a different construction which was not previously possible to produce in a reliable, cost effective manner.

PVC - clear front sheet
copolymer
PET - decorative, metalized, hologram, etc.. over-printed front design
copolymer
PVC - split core This new design has shown through testing and qualification stage shows that there is no need to have a full "Design B," since the copolymer layer of the current invention allows for the PET and PVC ("polyvinyl chloride") layers to move independently (i.e., contract or expand independent of each other during heating and cooling) of each other during the thermal press process allowing for a more traditional method of just using the simplified construction for the back of the card:

PVC core - printed back design
PVC - clear bottom cover

None of the previous inventions and patents, taken either singly or in combination, is seen to describe the instant invention as claimed.

SUMMARY OF THE INVENTION

Accordingly, it is a principal object of a preferred embodiment of the invention to provide a design for a credit card, gift card or other multilayer product having two dissimilar materials bonded together.

It is another object of the invention to provide a card having a non-mirror image front to back construction by utilizing only a single PET layer sandwiched between two PVC layers.

It is a further object of the invention to utilize a copolymer such as a thermoplastic such as Ethylene Ethyl Acrylate Copolymer ("EEA") between two disparate layers to allow the layers to move independently of each other during production while still forming a planar/non-distorted card.

Still another object of the invention is to provide a flexible polymer between two adjacent layers to allow the polymer to prevent distortion between the two adjacent layers as they thermally expand or contract during production of a credit card, gift card or other object.

It is an object of the invention to provide improved elements and arrangements thereof in an apparatus for the purposes described which is inexpensive, dependable and fully effective in accomplishing its intended purposes.

These and other objects of the present invention will be readily apparent upon review of the following detailed description of the invention and the accompanying drawings. These objects of the present invention are not exhaustive and are not to be construed as limiting the scope of the claimed invention. Further, it must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

BRIEF DESCRIPTION OF THE DRAWINGS

FIGS. 5-7 show stresses and bending introduced by relative differences in parts of a product during processing.

Similar reference characters denote corresponding features consistently throughout the attached drawings.

DETAILED DESCRIPTION OF THE PREFERRED EMBODIMENT(S)

Figure 1:
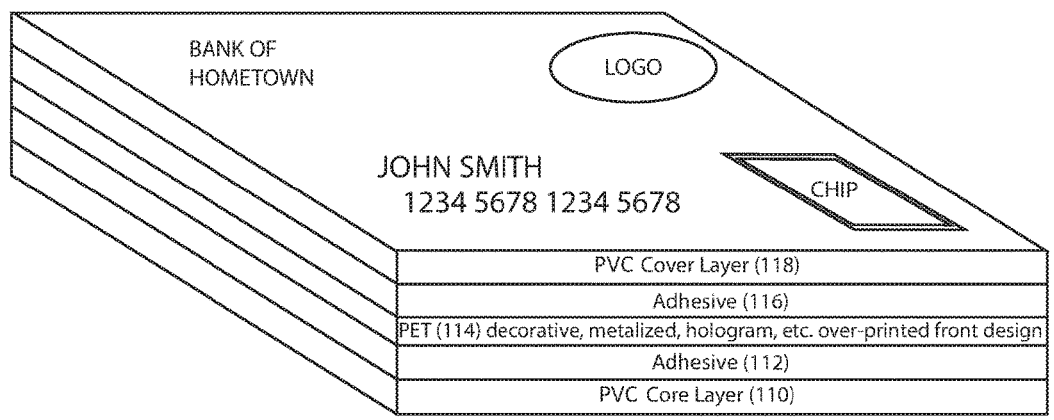
FIG. 1 is a diagrammatic view of a credit card according to the present invention.

The present invention is to a method of manufacturing using Dynamic Thermal Balancing (DTB) to produce a credit card, gift card, key card (collectively "magnetic stripe card" or "layered plastic card") or other layered plastic object. For simplicity, we will describe the construction of a single credit card, but one skilled in the art would recognize that the production process could be used to form other objects in a planar card shape or for use in building non-planar objects such as a plastic cup.

DTB is a technology that allows dissimilar material types to be thermally laminated together and maintain flatness, appearance, and functionality. It is based on the concept of matching the coefficient of thermal expansions (CTE) of the dissimilar materials with tie layers that can flow but stabilize giving the needed end properties and thereby significantly reduce the amount of rejected product.

Current credit cards are produced as the combination of a number of layers. Each layer has its own purpose, whether to provide support, protection or receive indicia or other components. Currently to maintain the credit card in a planar shape, each layer of the card needs to be symmetric to the other layers so that each layer expands or contracts identically with the other layers to prevent bending (see FIGS. 5-7) or pitting or other flaws that will result in a high rejection rate of the produced cards. When each layer is similar, there is less stress or relative movement between the layers, reducing errors in the cards. However, being limited to symmetric layers reduces the flexibility in constructing a card with the desired characteristics in the most efficient manner. For example, the current method may require additional non-essential layers in the card to ensure that each part of the card expands and contracts in conjunction with the others.

For example, current cards require the use of a matched front and back ("mirrored") structures to prevent "orange peel" (pitting or tiny cracking on the surface) but mainly to prevent the resulting product from becoming non-planar. If the two structures being joined in the hydraulic press are too dissimilar, they may expand and contract at different rates causing the two surfaces to destroy the desired flatness of the product. FIGS. 5-7 show an illustration of this concept where stresses and bending are introduced into a product by having a relative variation in expansion or contraction rates of different parts of a product. In FIG. 5, the left structure 510 is joined to the right structure 514 by an adhesive 512 or the like in a hydraulic press or by similar method. If the left side expands relative to the right structure, this can cause bending stress or pitting of the surfaces. Since typically one of the right and left structure is transparent, this pitting may be visible and give an "orange peel" look to the product.

By providing a free flowing copolymer between the layers that can thermally balance between the two expanding/contracting materials, the "primer" layer or "thermal balance layer" can absorb the difference between the two without cracking, bending or pitting and can "reset" into position when the heating/cooling has ended. The thermal balance layer also physically isolate the layers from each other.

Currently, the market is being supplied by a PreLAM that limits the card manufacturer to use what is called a balanced (i.e., a front to back "Mirror Image") structure. Because there are currently multiple types of polymers used in order to incorporate holograms, silver mirror, among other special effects in the cards, the cards are built as shown below in a symmetrical design to prevent induction of manufacturing flaws and reduce the final product rejection rate:

Design A (Front of Card)

PVC - clear front cover
PET - decorative, metalized, hologram, etc., over-printed front design
PVC - split core Design B (Back of Card)

PVC - split core
PET - clear over printed back design
PVC - clear bottom cover

The two symmetric pieces are then assembled together (i.e., A+B) to make the card.

Current Design

The current invention uses a different construction which was not previously possible to produce in a reliable, cost effective manner. Instead of having a matched composite back and front structure, the present invention has a front, back and middle structure separated by a copolymer. See FIG. 1.

In process, a roll 10 of Polyethylene terephthalate ("PET") consists of the semicrystaline material. The material can be transparent of opaque and white depending on its structure and particle size. The roll has a decorative layer applied 12 to the PET. This can be metal, aluminum, a hologram, logo, brushed metal, vapor deposition metal layer, etc. The decorative layer can applied in a way (such as vapor deposition) in such an amount to appear as a complete metal layer, but with microscopic gaps to prevent the layer from blocking ("reflecting") the antenna from transmitting or receiving a signal through the metal layer ("attenuation of the antenna signal"). This increases the effective range of the card for use a proximity device instead of having to swipe or insert a chipped card having an antenna. Presently cards manufactured with a metal layer over the antenna suffer the drawback that the antenna signal is so attenuated that it cannot effectively be used as a proximity payment method.

Once the decorative layer is applied to the PET core, a Copolymer is applied 16 to one surface of the decorated PET core. This application is preferably achieved by an extrusion process, but is not limited to such. The copolymer is preferably Ethylene Ethyl Acrylate ("EEA") because it is a thermal plastic and is malleable enough to move and flow with different expansion and contraction rate products on either side of the EEA. The EEA acts as a primer or thermal barrier to provide a buffer between the plastics on either side of the EEA and not transfer any movement forces from one side to the other during heating or cooling of the product. This isolation of the two opposite sides of the EEA around the PET also prevents pitting by "filling in" any voids as the product cools again so that looking through a clear PVC section, no roughness is seen.

Preferably, the PET is encapsulated in to layers of EEA, each layer having a width of about 0.5 to 6 mm, and more preferably about 1 mm in thickness. EEA is a copolymer in a matrix of ethylene and is preferably provided as 15% EEA and 85% LDPE ("Low density Polyethylene"). However, any copolymers of ethylene may be used. Additionally, other polyolefins may also be used such as polypropylene. Additionally, but less preferred, EAA ("Ethylene Acrylic Acid") or EVA ("d ethylene vinyl acetate") could be substituted in for the EEA. An important feature of the thermal barrier is that it Bonds to polar substrates, to metals, to ester groups, to vinyl groups, etc. In this way, the PET layer could be different material such as metal that directly incorporates the decorative layer since the EEA will bond directly to metal.

After the EEA is applied, a cooling drum 18 cools the decorated PET structure. The process is then repeated by applying an EEA layer 20 to the opposite side of the PET structure and then cooling it with a cooling drum 22.

An adhesive layer 24 is then applied to the decorative structure. The decorative structure is then laminated 26 to a clear PVC layer through a laminating dip section and wound into a roll 28. This is the PreLam roll that is supplied to a card manufacture. It is important to note that the use of EEA as the isolation layers allows the shipment of the PreLam roll as a roll. Currently, the preLam must be sent as sheet to prevent the sheet from curling ("roll set") when ready to be cut into cards. The softer isolation layer allows the cards to more easily go from the roll form to the flat planar form required for the cards.

Finishing of the Card by Card Manufacturer

Figure 4:
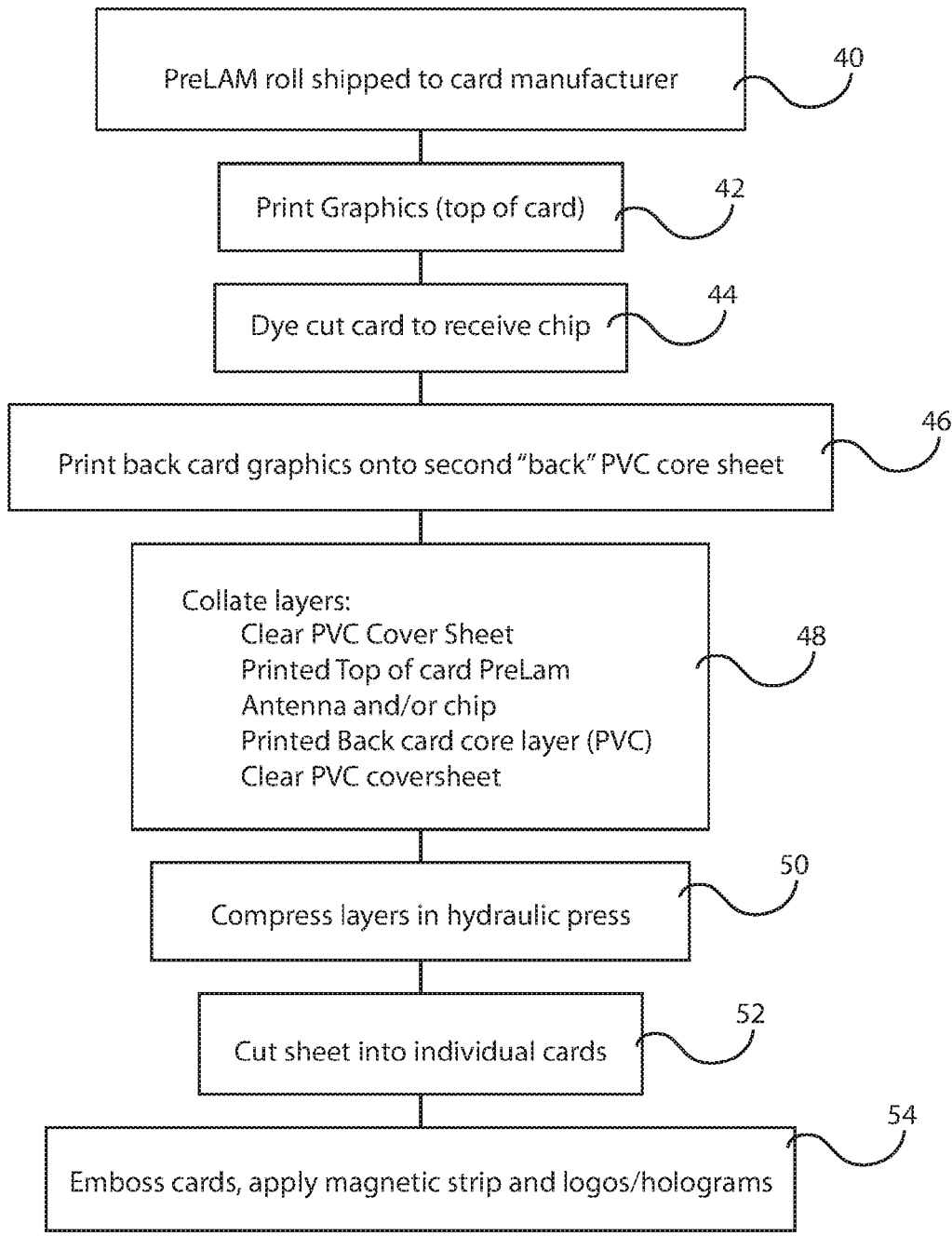
FIG. 4 is a flow diagram showing a process for further processing the product of the flow diagram of FIG. 3.

Referring now to FIG. 4. The preLam roll is shipped 40 to a card manufacture. This raw stock has the decorative layer and a clear PVC layer. It is ready to be individualized and cut into cards with the name of the card holder, the number of the account, and banking information, etc.

To accomplish this, the graphics and text are printed to the top of the card 42. The card may then be dye cut to provide an area to receive a chip 44. The back of the card is then printed to a second "back" PVC core sheet 46.

The layers used in constructing the cards are then collated 48. This preferably includes a) a clear PVC covers sheet; b) a printed top of the card PreLam; c) an antenna and/or chip'd) a printed back card core later (PVC); e) a clear PVC coversheet.

The layers are then compressed in a hydraulic press 50. Here the heat caused in the pressing causes the flow stabilizing copolymer such as EEA to act to isolate the printed back core layer and the PET decorated structure from each other so that the card remains planar ("flat") and the translucent layers are clear and unclouded. The thermoplastic copolymer serves this function as described above. The thermoplastic copolymer absorbs any relative changes of the PVC and PET layer and remains flat and intact after hydraulic pressing.

The cards are then cut into individual cards 52 and embossed 54 to cause raised lettering or the like on the card with the name of the card holder and account numbers, etc. The card may also have a magnetic strip and any logs or holograms applied thereto.

This new design has been shown through testing and qualification stage shows that there is no need to have a full "Design B," since the copolymer layer of the current invention allows for the PET and PVC layers to move independently (i.e., contract or expand independent of each other during heating and cooling) of each other during the thermal press process allowing for a more traditional method of just using the simplified construction for the back of the card:

| PVC core - printed back design |
| PVC - clear bottom cover |

Figure 2:
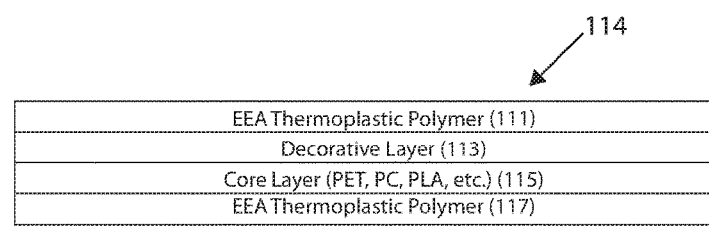
FIG. 2 is a diagrammatic view of the decorative structure of the credit card according to the present invention.
Figure 3:
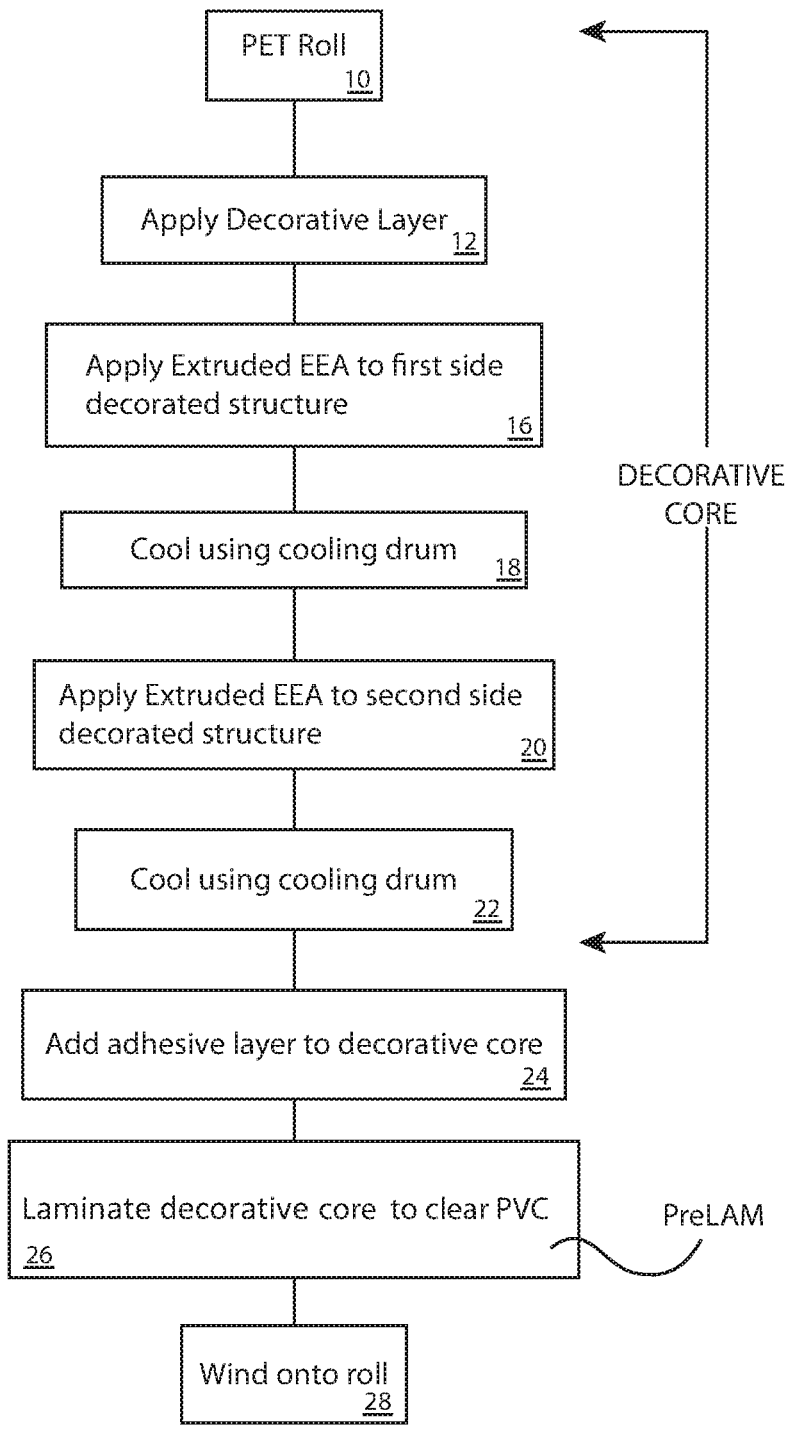
FIG. 3 is a flow diagram showing a process of making a product according to the present invention.

As shown in FIG. 2, the decorated PET layer 113, 115 (including any decoration) is fully encapsulated by the EEA thermal plastic barrier 111, 117. The EEA encapsulated decorative core 114 (FIG. 1) is then adhesively coated 112, 116 and laminated to one or more PVC layers 110, 118 to form the PreLam. By fully isolating the PET in the ethylene copolymer, the variation in expansion and contraction of the PVC layer(s) and the PET is fully absorbed and compensated by the EEA isolating layers. This prevents the difference in the layers from exerting stresses and other forces on the PreLam that would cause it to curl, pit, or bend.

One skilled in the art would appreciate that the concept of a thermoplastic coplanar isolation layer between two dissimilar plastic layers could be used in the construction of objects other than cards. For example, the sheets could be rolled to make a tube or a cup, such as a printed logo cup for a football stadium cup with a team's logo, etc.

While this invention has been described as having a preferred design, it is understood that it is capable of further modifications, uses and/or adaptations of the invention following in general the principle of the invention and including such departures from the present disclosure as come within the known or customary practice in the art to which the invention pertains and as maybe applied to the central features hereinbefore set forth, and fall within the scope of the invention and the limits of the appended claims. It is therefore to be understood that the present invention is not limited to the sole embodiment described above, but encompasses any and all embodiments within the scope of the following claims.

I claim:

1. A method of making plastic sheets from two or more different layers, comprising:
   providing a first sheet of material having a front side and a back side;
   applying a decorative layer to the front side of the first sheet of material;
   encapsulating the first sheet of material and the decorative layer between a first layer of a copolymer of ethylene and a second layer of a copolymer of ethylene to form an encapsulated decorated structure; wherein the first layer of the copolymer of ethylene is provided on a front of the decorative layer and the second layer of the copolymer of ethylene is provided on the back side of the first sheet of material;
   adhering the encapsulated decorated structure to a second sheet of material;
   hydraulically compressing the encapsulated decorated structure and the second sheet together; wherein the second layer of copolymer of ethylene prevents the first sheet of material from contacting the second sheet of material; and
   winding the layered end product into a roll;
   unwinding a length of the layered end product from the roll;

allowing the unwound length of the layered end product to flatten printing graphics on a top surface of the flattened length of the layered end product;

die-cutting regions in the top surface;

inserting card chips into the die-cut regions;

placing a clear polyvinyl chloride ("PVC") cover sheet over the top surface of the layered end product;

compressing the PVC cover sheet and the layered end product in a hydraulic press to form a bonded card stock; and cutting the bonded card stock into individual cards.

2. The method according to claim 1, wherein the first sheet of material is made of polyethylene terephthalate ("PET").

3. The method according to claim 2, wherein the second sheet of material is made of polyvinyl chloride ("PVC").

4. The method according to claim 3, wherein the copolymer of ethylene is made of Ethylene Ethyl Acrylate Copolymer ("EEA").

5. The method according to claim 3, wherein the copolymer of ethylene is a thermoplastic.

6. The method of claim 5 further comprising:

thermally and physically isolating the first sheet of material from contacting the second sheet of material with the second layer of copolymer of ethylene; and preventing bending of the layered end product during heating and cooling of the first sheet of material and the second sheet of material during manufacture of the layered end product due to relative contraction and expansion of the first sheet of material and the second sheet of material.

7. The method according to claim 1, wherein the first sheet of material is made of metal.

8. The method of claim 1 further comprising:

embossing raised lettering on the individually cut cards.

9. The method of claim 1 further comprising:

inserting a proximity antenna in communication with the card chips into the die-cut regions.

10. The method according to claim 1, further comprising:

applying a magnetic strip to each of the individual cards.

* * * * *